US 6,795,521 B2

(12) United States Patent
Hsu et al.

(10) Patent No.: US 6,795,521 B2
(45) Date of Patent: Sep. 21, 2004

(54) COMPUTER-AIDED DIAGNOSIS SYSTEM FOR THORACIC COMPUTER TOMOGRAPHY IMAGES

(75) Inventors: Li-Yueh Hsu, Vienna, VA (US); Fleming Y.-M. Lure, Potomac, MD (US); Ruiping Li, Rockville, MD (US); Xin-Wei Xu, Gaithersburg, MD (US); Jyh-Shyan Lin, North Potomac, MD (US); Edward A. Martello, Glenwood, MD (US); H.-Y. Michael Yeh, Potomac, MD (US)

(73) Assignee: Deus Technologies LLC, Rockville, MD (US)

(*) Notice: Subject to any disclaimer, the term of this patent is extended or adjusted under 35 U.S.C. 154(b) by 124 days.

(21) Appl. No.: 10/214,464

(22) Filed: Aug. 8, 2002

(65) Prior Publication Data

US 2003/0035507 A1 Feb. 20, 2003

Related U.S. Application Data

(60) Provisional application No. 60/312,759, filed on Aug. 17, 2001.

(51) Int. Cl.$^7$ .............................................. A61B 6/03
(52) U.S. Cl. ............................ 378/4; 378/8; 378/901
(58) Field of Search .................... 378/4, 8, 15, 19, 378/901; 382/131

(56) References Cited

U.S. PATENT DOCUMENTS

| | | | |
|---|---|---|---|
| 5,359,513 A | 10/1994 | Kano et al. | |
| 5,633,951 A | 5/1997 | Moshfeghi | |
| 5,871,018 A | 2/1999 | Delp et al. | |
| 5,946,425 A | 8/1999 | Bove, Jr. et al. | |
| 6,067,373 A | 5/2000 | Ishida et al. | |
| 6,078,680 A | 6/2000 | Yoshida et al. | |
| 6,240,201 B1 | 5/2001 | Xu et al. | |
| 6,470,092 B1 * | 10/2002 | Li et al. | 382/132 |

\* cited by examiner

*Primary Examiner*—David Bruce
(74) *Attorney, Agent, or Firm*—Venable LLP; Robert Kinberg; Jeffrey W. Gluck (57) ABSTRACT

A method of detecting and analyzing abnormalities, like lung nodules, in thoracic computer tomography (CT) images uses digital image processing techniques and adaptive computing methods. The techniques include an automatic detection process to detect candidate abnormalities, an image matching process to match CT slices from two different CT scans, and a measurement process that determines parameters of the candidate abnormalities. Final results and processed CT images are displayed on a user interface.

29 Claims, 7 Drawing Sheets

COMPUTER-AIDED DIAGNOSIS SYSTEM FOR THORACIC COMPUTER TOMOGRAPHY IMAGES

CROSS-REFERENCE TO RELATED APPLICATIONS

This application claims the priority of U.S. Provisional Application No. 60/312,759, filed on Aug. 17, 2001, incorporated herein by reference in its entirety.

BACKGROUND OF THE INVENTION

1. Field of the Invention

The present invention relates to methods and systems for automated and interactive processing of medical computer tomographic (CT) images, and is more specifically related to computerized methods and systems for multi-structure enhancement, volume matching, object analysis, and object detection in thoracic CT images using digital image processing techniques.

2. Background Art

Lung cancer has the highest cancer mortality for both men and women worldwide. Early detection and treatment of localized lung cancer at a potentially curable stage can significantly increase the patient survival rates. Studies have shown a survival rate of approximately 60% when lung cancer is detected in the early stages. However, only approximately 15% of lung cancers are diagnosed at an early stage when the disease is still localized.

Diagnosis of lung cancer can be accomplished using either projectional (i.e., chest radiography) or cross-sectional (i.e., computer tomography) techniques. Chest X-ray films have been used for lung cancer diagnosis as a conventional method for mass screening, due to their ready availability and reasonable sensitivity at showing localized lung abnormalities. However, there are obvious disadvantages inherent in the use of a projection image, the most notable being the masking of nearly half of the lungs by overlaying structures such as the heart and diaphragm.

Computer tomography (CT) provides a cross-sectional image of the lung, as opposed to the projection image provided by a chest X-ray. Since the early 1990s, the volumetric CT technique has been available to provide virtually contiguous spiral scans that cover the chest in a few seconds. This technique has greatly reduced CT image artifacts caused by unequal respiratory cycles, partial volume, and cardiac motion. Newer models of the helical CT system are capable of performing the scan and image reconstruction simultaneously. Detectability of pulmonary nodules has been greatly improved with this modality (Zerhouni et al., "Factors Influencing Quantitative CT Measurements of Solitary Pulmonary Nodules," *J. Comput. Assisted Tomography*, 6:1075–87, 1982; Siegelman et al., "Solitary Pulmonary Nodules: CT Assessment," *Radiology*, 160:307–312, 1986; Zerhouni et al., "CT of Pulmonary Nodule: A Cooperative Study," *Radiology*, 160:319–327, 1986; Webb, W. R., "Radiologic Evaluation of the Solitary Pulmonary Nodule," *Am. J. Roentgenology*, 154:701–708, 1990). High-resolution CT has also proved to be effective in characterizing the edges of pulmonary nodules (Zwirewich et al., "Solitary Pulmonary Nodule: High-Resolution CT and Radiologic-Pathologic Correlation," *Radiology*, 79:469–476, 1991).

Recent studies have demonstrated that spiral CT can detect small lung nodules that are barely visible on chest X-ray films (Henschke et al., "Early Lung Cancer Action Project: Overall Design and Findings from Baseline Screening," *The Lancet*, Vol. 354, pp. 99–105, 1999; Sone et al., "Mass Screening for Lung Cancer with Mobil Spiral Computed Tomography Scanner," *The Lancet*, Vol. 351, pp. 1242–45, 1998). Zwirewich and his colleagues reported that shadows of nodule spiculation correlate pathologically with irregular fibrosis, localized lymphatic spread of a tumor, or an infiltrative tumor growth; pleural tags represent fibrotic bands that usually are associated with juxtacicatrical pleural retraction; and low attenuation bubble-like patterns are correlated with bronchioloalveolar carcinomas. These are common CT image patterns associated with malignant processes of lung masses.

Although skilled pulmonary radiologists have a high degree of accuracy in diagnosis of lung cancer using advanced CT imaging technology, there remain challenges that can not be overcome using current methods of training or by attaining high levels of clinical skill and experience. These include the miss rate for detection of small pulmonary nodules, the detection of minimal interstitial lung disease, and the detection of changes in preexisting interstitial lung disease.

Because a majority of solitary pulmonary nodules (SPN) are benign, Siegelman et al. (1986) determined three main criteria for benignancy: (a) high attenuation values distributed diffusely throughout the nodule, (b) a representative CT number of at least 164 HU, and (c) hamartomas, which are lesions 2.5 cm or less in diameter with sharp and smooth edges and a central focus of fat with CT numbers of −40 to −120 HU. These reports suggest that these are features that a computer-aided analytical tool could use to differentiate benign from malignant lesions. As to detection of lung cancers by various modes of CT, Remy-Jardin et al. (Remy-Jardin et al., "Pulmonary Nodules: Detection with Thick-Section Spiral CT versus Conventional CT," *Radiology*, 187:513–520, 1993) showed that the thick-section (10 mm) helical CT markedly reduces cardiac motion artifacts and misses fewer lung nodules than the conventional CT. In Japan, CT-based lung cancer screening programs have been developed (Tateno et al., "Development of X-ray CT for Lung Cancer Detection," *Shih-Iryo*, 17(10):28–32, 1990; Iinuma et al., "Basic Idea of Lung Cancer Screening CT (LSCT) and Its Preliminary Evaluation," *Jap. J. Radiol. Med.*, 52(2):182–190, 1992). In the U.S., however, only a limited demonstration project, funded by the NIH/NCI, using helical CT has been reported (Yankelevitz et al., "Repeat CT Scanning for Evaluation of Small Pulmonary Nodules," *Radiology*, 1999). The trend towards using helical CT as one of the clinical tools for screening lung cancer has four motivating factors: (1) an alternative to the low sensitivity of chest radiography in the detection of small cancers (smaller than 10 mm); (2) the development of higher throughput, low-dose helical CT; (3) the potential reduction of health care costs using helical CT; and (4) the development of a computer diagnostic system as an aid for pulmonary radiologists. One can anticipate that the cost of each CT examination will still be higher than that of a conventional chest X-ray. However, for the high-risk population, the greater potential of this imaging modality for detecting early lung cancer may outweigh its increased cost.

Several clinical trials are now underway in the U.S. Studies at the Mayo Clinic and the University of South Florida were funded in 1999 and have recently begun. The method is being shown to detect small volume lung cancers, but with false positive rates for nodule detection in the range of 23–50%. In Japan, direct questioning of Drs. Sone and Kaneko (Oct. 1–3, 1999, Conference on Screening for Lung Cancer, Cornell Medical College, New York) indicated that the false negative rate in the work they were reporting was 10 to 15% and sometimes as high as 90% when the lesion is very small. In addition, Dr. Sone reported at that meeting that 16% of those patients undergoing thoracotomy had non-cancerous lesions and an additional 6% had atypical adenomatous hyperplasia, a benign lesion of uncertain malignant potential.

Given the frequency of false positive detections in both the Japanese and U.S. studies, the frequency of false negative exams in Japanese studies, and the frequency of thoracotomy uncovering only benign disease, there is a pressing need for development of improved diagnostic methods, as the use of screening CT is rapidly increasing and high false positive rates will result in many unnecessary procedures. Computer algorithms have been shown to increase sensitivity and/or specificity in the detection of lung cancer on chest radiographs and breast cancer on mammograms. Thus, application of these methods to screening CT is appropriate.

U.S. Pat. No. 6,125,194, filed Feb. 4, 1998, having the same assignee as the present application and incorporated herein by reference, is aimed specifically at identification of the smallest of lung nodules, 3 to 20 mm, well within the size limits for T1 cancer (<30 mm). If there is to be a measurable benefit in the use of the helical CT, it is likely to be in detection of cancers at the lower limits of size detectable by radiologists, at or just below the radiographically detectable size.

SUMMARY OF THE INVENTION

An object of the present invention is to provide a computerized method and system for improving diagnostic performance for thoracic CT images.

Advantageously, the invention provides a fast method of assisting the radiologist in the comparison of two CT images that were scanned at different times. The radiation dosage of two image scans used for either prospective or retrospective comparison can be different. That is, either low-dose or high-resolution CT images or a combination of the two can be used.

The invention provides a method of segmenting the lung field. Based on the segmented lung area, this invention also provides a way to enhance both the lung and the mediastinum histograms separately (for multi-structure enhancement).

The invention additionally provides a method of further segmenting the region of interest (within the lung) from 2D slices and thus to reconstruct the 3D objects (such as vessels, bronchi, or nodules). The intrinsic (e.g., intensity) and extrinsic (e.g., geometric) properties of these extracted 3D objects can then be used for the feature analysis.

According to a further aspect of the invention, there is provided a method to compute parameters of the features associated with nodules and cancers. The features include the size, sphericity, speculation, and boundary of the suspected nodule or cancer.

Advantageously, the method of the invention allows for detecting solitary lung nodules. Based on the extracted features from previous steps, one can use an artificial neural network, fuzzy-logic, or rule-based classifiers to distinguish nodules from other objects such as vessels or chest walls.

BRIEF DESCRIPTION OF THE DRAWINGS

The features of the present invention and the manner of attaining them is best understood by reference to the following description and the accompanying drawings, wherein.

DETAILED DESCRIPTION OF THE INVENTION

With reference to the drawings, it is noted that similar numerals refer to similar elements. It should be understood that the sizes of different components presented in the figures have no meaning insofar as their relative proportions and are presented for visual clarity and for the purpose of explanation.

Figure 1:
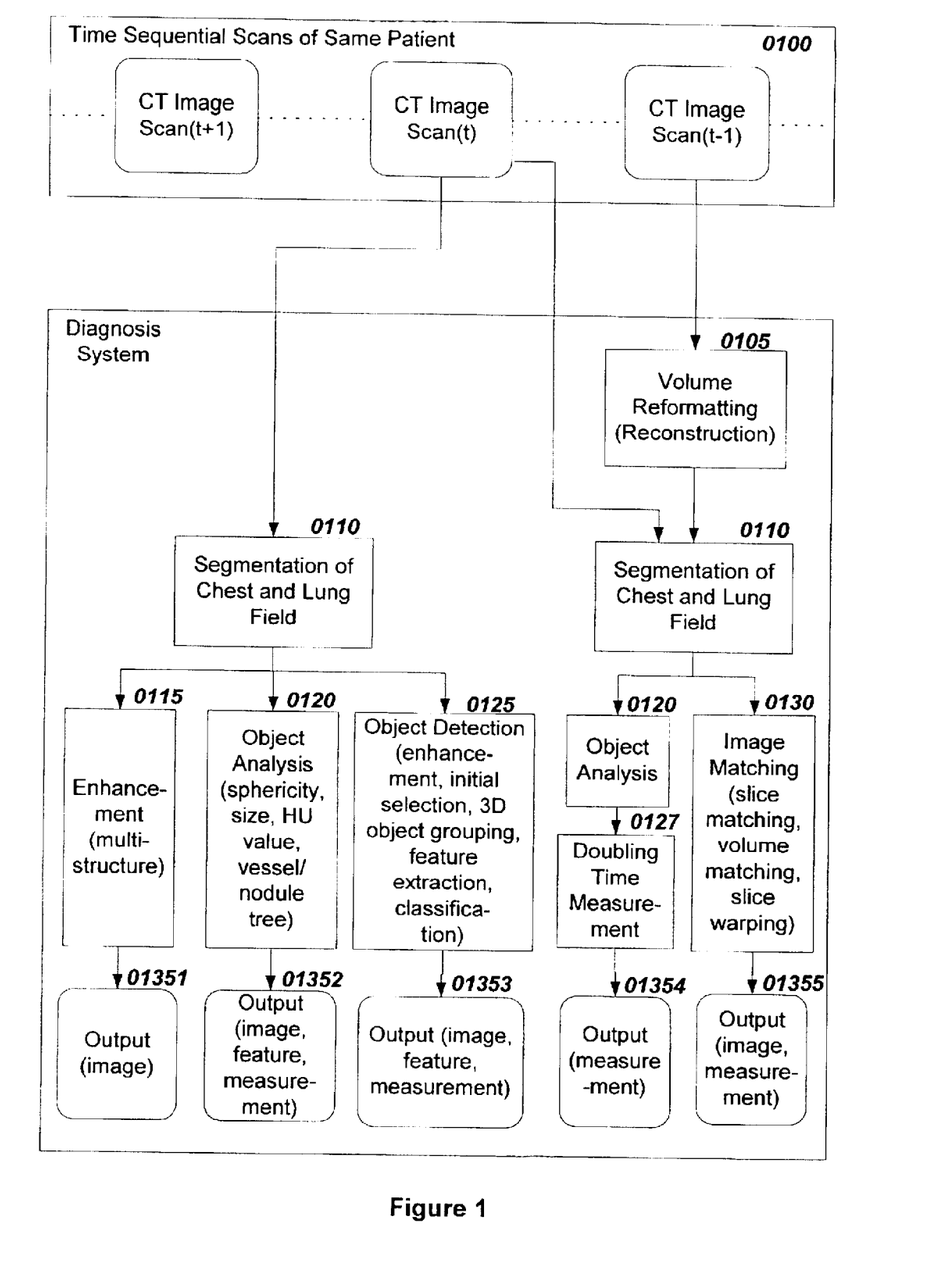
FIG. 1 is a diagram of an embodiment of a computer-aided system for thoracic computed tomography image diagnosis according to the invention.

Referring now to FIG. 1, there is shown a schematic diagram of an embodiment of the automated method for the computer-aided diagnosis of thoracic CT image according to the invention. FIG. 1 is a schematic diagram illustrating an automated method for multi-structure enhancement, object segmentation, volume matching, and nodule detection according to the invention. In FIG. 1, the method according to the present invention includes initial acquisition of CT images at sequential time intervals (step 0100). This acquisition of the images could differ in time or in scanning protocol (e.g., current dosage, slice thickness, FOV, etc.). In the system presented in FIG. 1, the user selects a CT image, e.g., scan(t), for computer-aided diagnosis. This scan goes through lung field segmentation (step 0110) to obtain the lung volume. The segmented lung volume will then be delivered to the later processing units for Multi-Structure Enhancement (step 0115), Object Analysis (step 0120), or Object Detection (step 0125). In the case when the user would like to compare the selected scan(t) with a different scan, e.g., scan(t-1), of the same patient for time sequential study (step 0130), the comparison would then require that the second selected image (here, scan(t-1)) go through a volume reformatting process (step 0105). Note that even though FIG. 1 shows step 0130 as having a single input, it receives two inputs, as reflected in FIG. 5, which will be discussed below.

Figure 2:
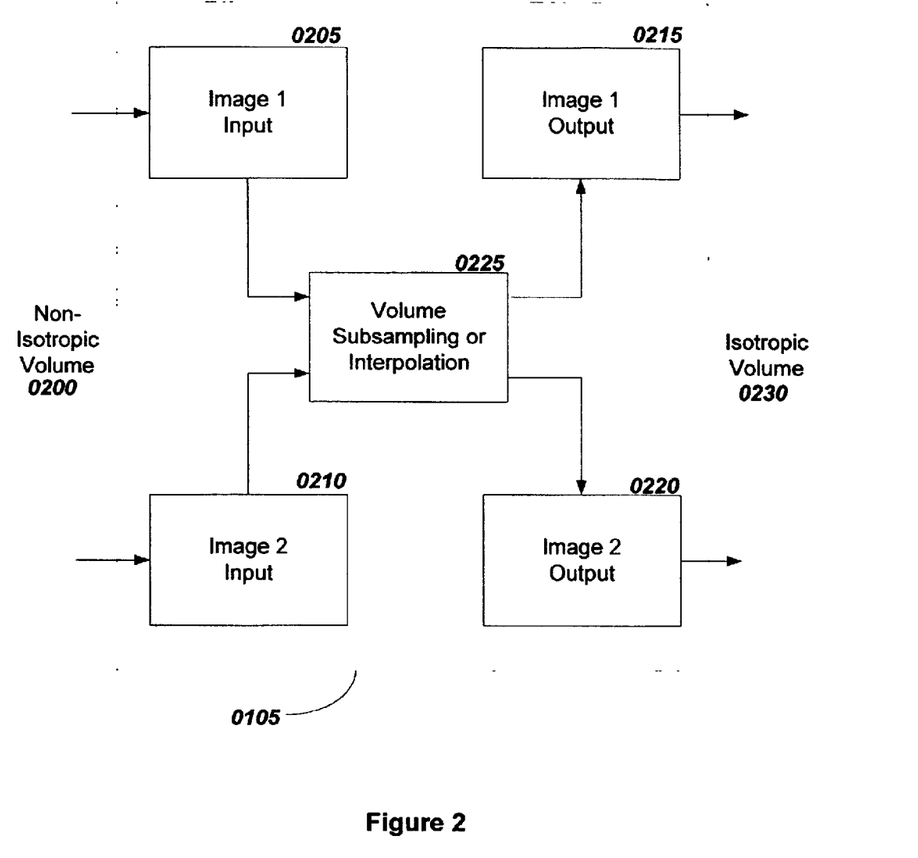
FIG. 2 is a block diagram of a process for volume reformatting.

A medical scan consists of a series of consecutive slices, and inter-slice spacing and in-plane resolution (voxel size) often differ if two images are acquired using different machines or protocols. In FIG. 2, the process of volume reformatting (step 0105) converts the voxel size of the second image, scan(t-1), into the same voxel size as the first image, scan(t), through either interpolation or a sub-sampling process. While this step does not require the first scan to be input, it does require information about the first scan in order to perform the aforementioned conversion.

Figure 3:
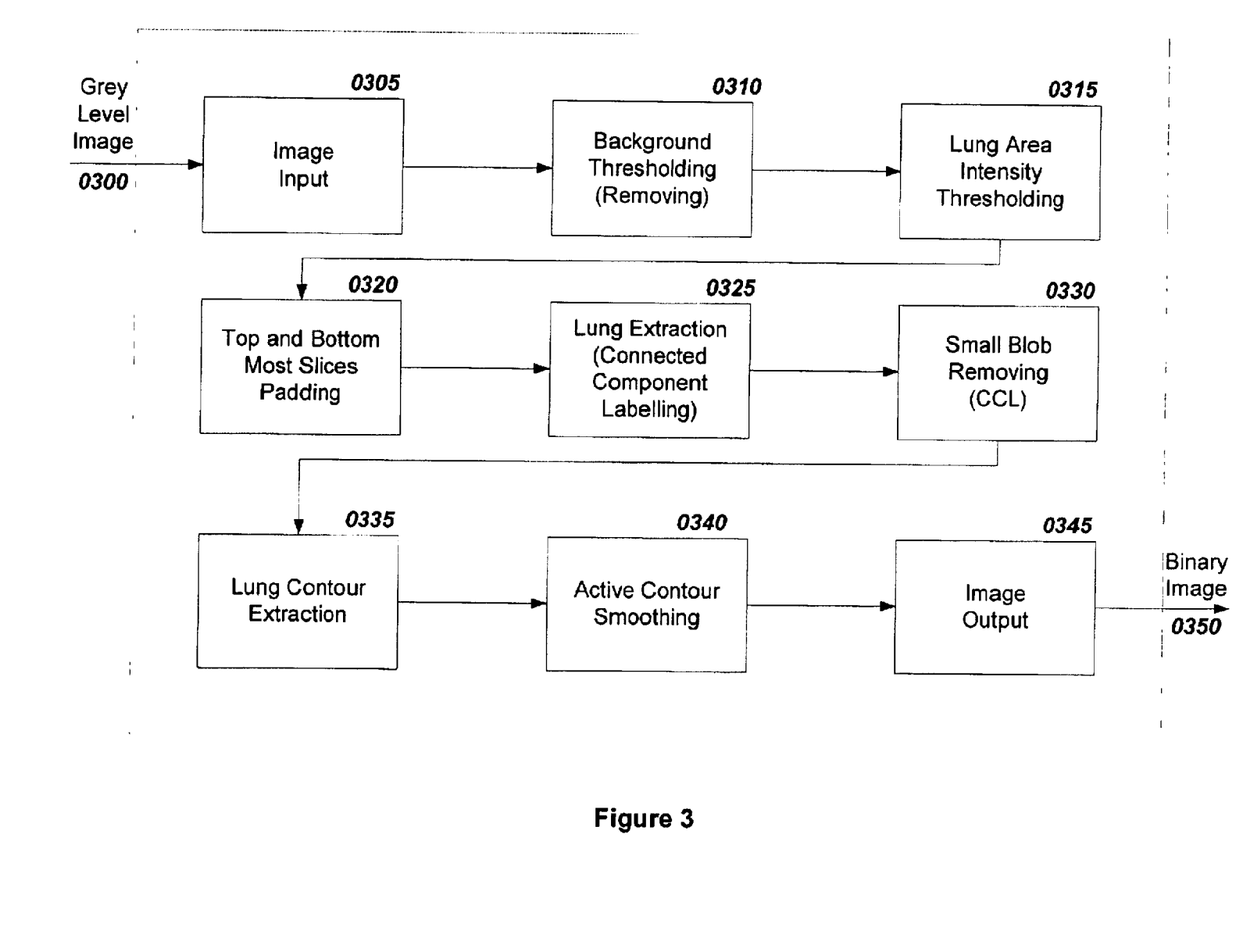
FIG. 3 is a block diagram of a process for lung field segmentation.

The systematic process of lung area segmentation and contour extraction (step 0110) is illustrated in FIG. 3. This stage of the process uses two steps of thresholding (steps 0310 and 0315) using computer-determined thresholds to convert the gray scale image to a binary (black and white) image. A connected component labeling process (step 0325) is then used to extract the lung region and is followed by contour extraction (step 0335) and smoothing (step 0340) operations, to obtain the lung contours.

First, a gray level histogram is constructed from the remaining pixels in the segmented thorax region. To select the threshold for removing the background noise from the CT image, a scaled Gaussian curve is fitted by least squares to the low-intensity range of the image histogram to obtain the background threshold. This threshold is then used to eliminate the low-intensity background noise from the CT data (step 0310).

From the analysis of the intensity histogram on the images, the lung region intensity is located mainly in the low-intensity area of the bimodal histogram. To determine a final threshold value to separate the lung from the body, a statistical correlation is used to evaluate all thresholds on the lung region to produce all possible thresholded images. These are then compared against the original image, using correlation as a measure of how similar the thresholded images are to the source. The threshold that produces the highest correlation is selected as the best choice to produce the binary lung image (step 0315). Here the image voxel value is set to either 0 (background pixel) or 1 (object pixel).

After the binarized image has been obtained, it is observed that the lung voxel (at gray level 0) is enfolded by the body voxel (at gray level 1). In the case of a high-resolution scan in which the image covers only part of the lung volume, the lung voxels are connected to the rest of the background voxels through the topmost and the bottommost slices. In this situation, step 0320 is used to pad one slice of object pixels on these two slices to ensure the lung is enfolded by the body pixels.

In step 0325, the connected component labeling process is used to extract the lung from the image. This step is performed by first inverting the values of the object and background voxels, followed by assigning different gray values to each connected region. Once the connected regions are "gray-leveled," only the largest connected region (lung) is retained, and other regions are deleted.

The binary lung image produced by the automated processes noted above still contains certain small isolated structures representing, for example, vessels, bronchi, or nodules. These small structures can then be removed using a "reversed" connected component labeling (CCL) process (step 0330). Inverting the voxel values ensures that the background region surrounding the lung area can be kept as the largest contiguous region. Subsequently, all the non-background voxels in the image can then be identified as the lung region.

Upon completion of the preceding steps, a sign change detection kernel is applied to the binary image to extract the lung contours (step 0335). This is accomplished by simply looking for change-of-value occurrences in any voxel from its six closest neighbors in 3D. If a value change is detected, the voxel will be marked as a contour (or surface) point.

The next step uses an active contour model, for example, the snake algorithm, to smooth the extracted contours (step 0340). The snake algorithm deforms the extracted lung contour based on an energy function of the original image content. The energy function for a snake is in two parts, the internal and external energies. The internal energy is the part that depends on intrinsic properties of the snake, such as its length or curvature. The external energy depends on factors such as image intensity or gradient. Given an initial contour of the lung region, the snake with an appropriate energy function can be programmed to evolve with the smoothness property of the lung boundary.

Figure 4:
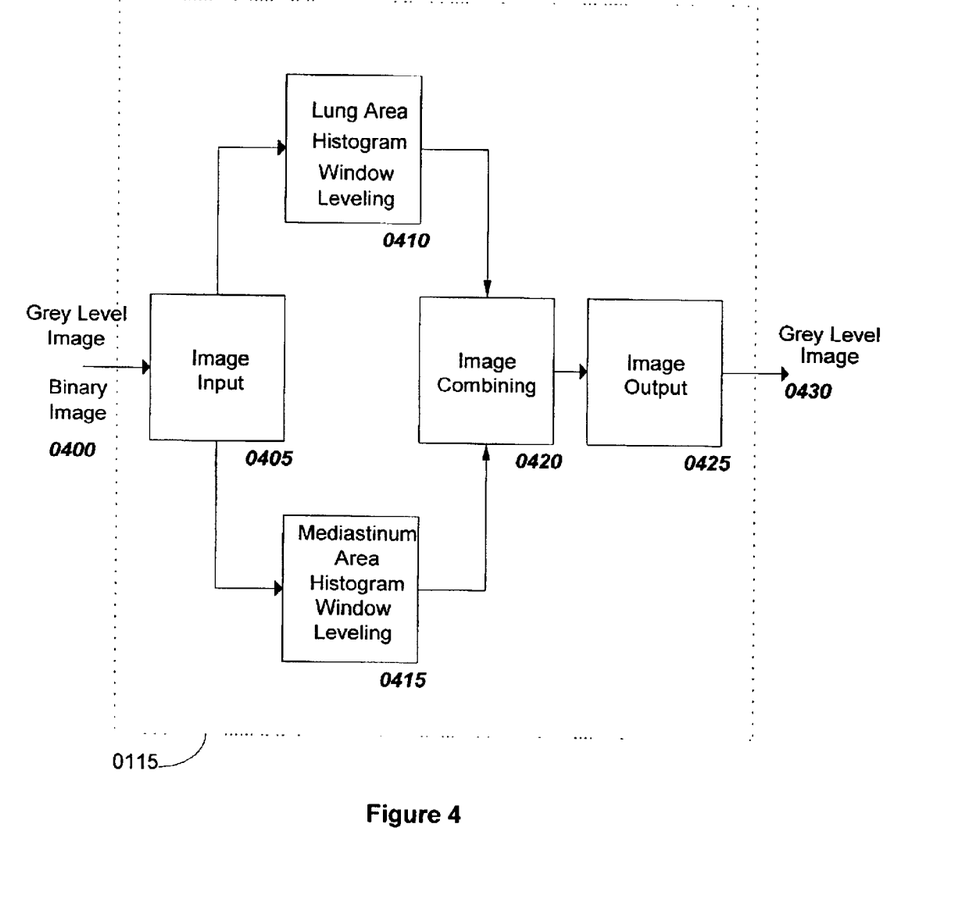
FIG. 4 is a block diagram of a process for multi-structure enhancement of the lung and mediastinum regions.

In FIG. 4, a multi-structure enhancement scheme for lung and mediastinum regions, embodying step 0115 of FIG. 1, is presented. This scheme performs contrast enhancement on both lung and mediastinum regions using different settings. First, the lung region gray level image (0400) that was output from FIG. 3 is contrast-enhanced using histogram equalization (step 0410). The separate mediastinum and background regions are processed again using another histogram equalization (step 0415). Finally, the results of both equalized images are added together (step 0420) to create an image in which contrast is enhanced over both lung and mediastinum regions.

Figure 5:
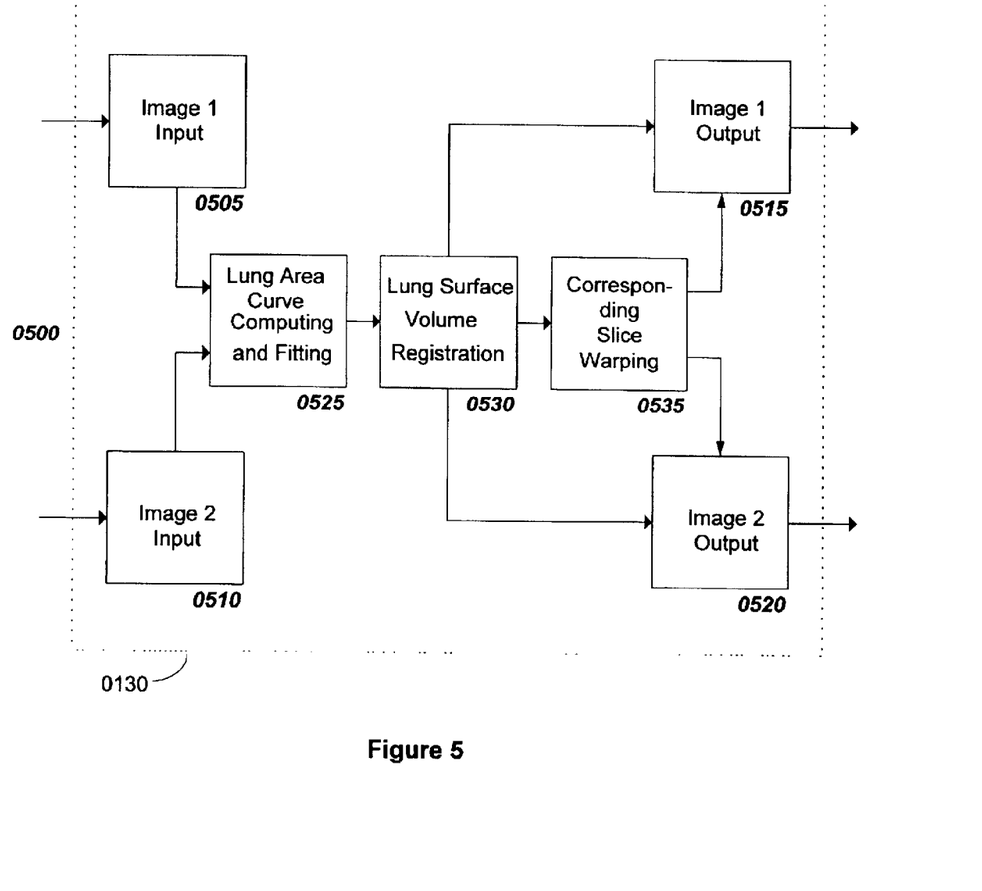
FIG. 5 is a block diagram of a process for image comparison (slice matching, volume registration, and image warping)

The procedure for time sequence study of slice and volume comparison of two CT images is illustrated in FIG. 5. FIG. 5 represents an embodiment of step 0130 (see FIG. 1). Two images that were acquired at different times are first processed using step 0110 to segment the lung region and contour; the two segmented images are input at steps 0505 and 0510, respectively. For each image, the lung area of each slice is computed over the volume to obtain a curve. The two curves of lung area are then compared to minimize the sum of the squares of their differences (step 0525). Once the slice matching is completed, the initial geometric locations of the two selected volumes are obtained and used in step 0530 for volume registration.

The volume registration process shown in step 0530 requires that the lung contours be extracted from two CT images. This step uses a least squares matching of two lung surfaces through an iterative closest point (ICP) algorithm. This algorithm implements rigid-body transformation, by minimizing the sum of the squares of the distance between two sets of contour points. Both the rotation and translation in three orthogonal axes are considered and are used to obtain the best transformation matrix. Once the volume registration is completed, the next step is to transform the second selected image according to the matrix and output the result.

The last step in the volume comparison is the corresponding slice warping (step 0535). This step is performed by inputting the second transformed image and warping it to the first one.

Figure 6:
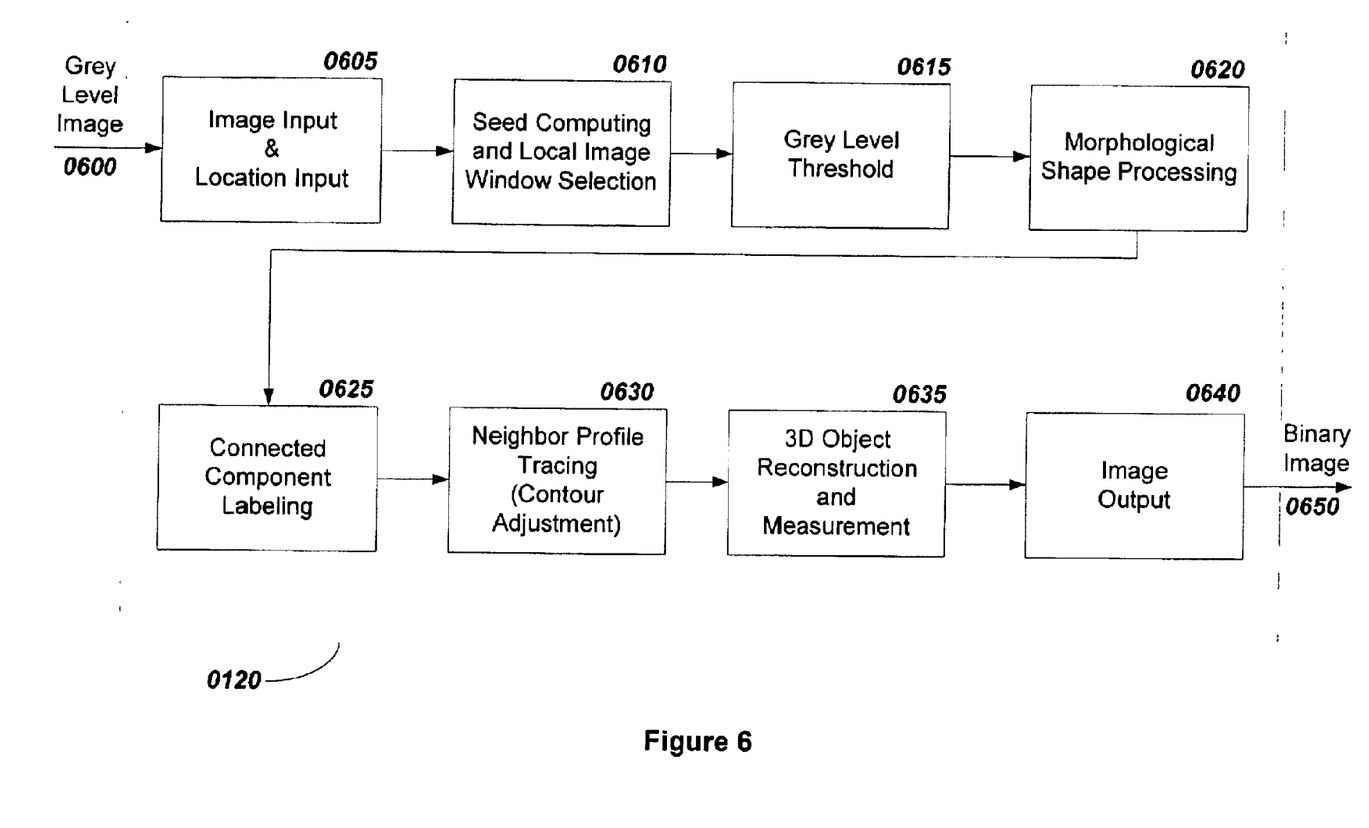
FIG. 6 is a block diagram of a process for object analysis (e.g., vessels, bronchi, nodules)
Figure 7:
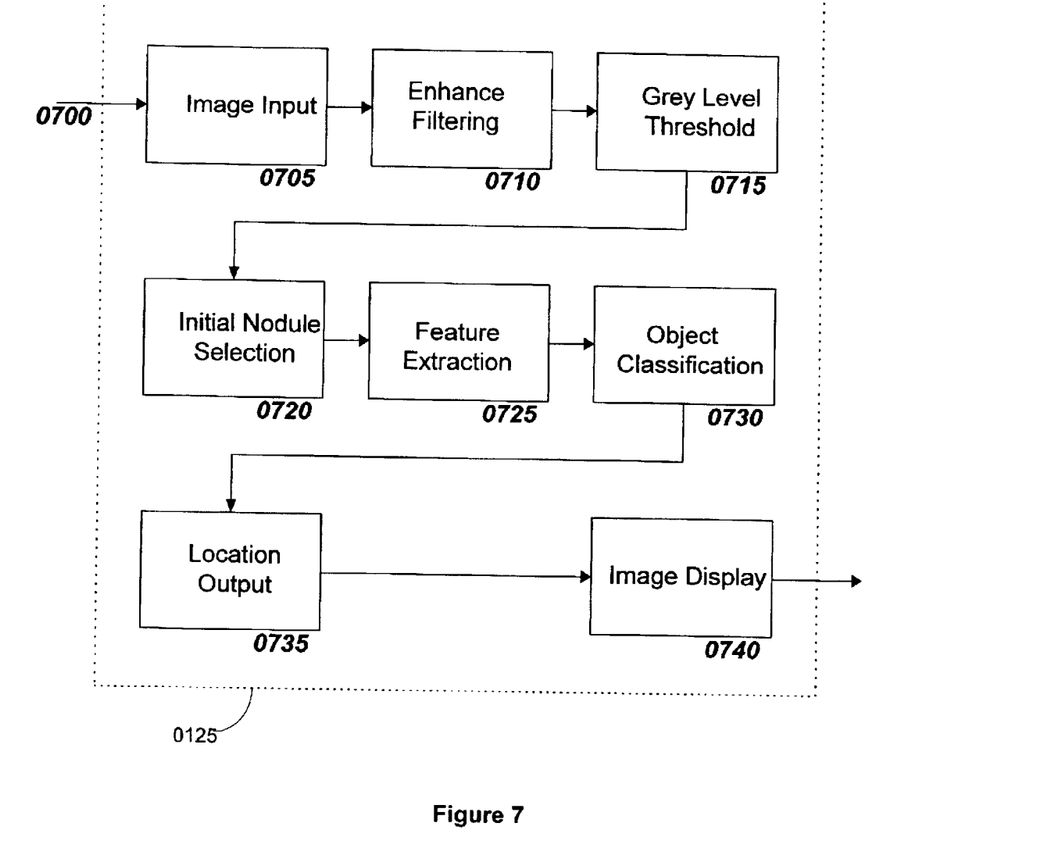
FIG. 7 is a block diagram of a process for object detection (e.g., nodule).

FIG. 6 depicts the object analysis function (step 0120). In this step, the object of interest to be analyzed can be vessel, bronchus, nodule, or other small round/spherical shaped structures located within the lung area. The location of an object of interest can either be manually selected by the user, automatically computed from the program, or determined by another system. The entire object analysis function is also part of the intermediate process in the object detection function (step 0125) as illustrated in FIG. 7 (i.e., as part of object classification, step 0730).

In FIG. 6, once an object of interest is identified (step 0605), the program first computes a start (seed) position for a consecutive measurement process. The seed location is computed as the center of gravity from a predefined local image window (step 0610).

From this local image window, the next step is to determine the threshold for binarizing the gray level image (step 0615). The threshold is selected by the following criteria: size, diameter, circularity, irregularity, and intensity variation. In particular, these criteria are used to examine the intensity histogram of the image and then to select an optimum threshold value. Some of the criteria, like size and diameter, will be upper bounds, while others, such as size, diameter, and intensity variation, will serve as lower bounds. Within these bounds, the value that achieves the maximum circularity (i.e., compactness or roundness) is selected as the final threshold.

Once the image is binarized, a morphological process (step 0620) is used to smooth and truncate the unnecessary connections. Connected component labeling is then used to isolate the smaller structure from the largest object within the local image (step 0625). After the smaller structure is extracted and initial contours are traced, the next step is to measure an intensity profile under each extracted contour. The continuity of the intensity profile is calculated to adjust the smoothness of the final contour. The volume size, long and short axes, average intensity, centroid locations, etc., of the final object will then be computed (step 0635). If there is one object (nodule) identified and measured in two different scans, the expected nodule doubling time will also be computed. The last step in this function is to output a 3D contour image for the identified object (step 0640).

In FIG. 7, object detection (shown as step 0125 in FIG. 1) can be performed on a 2D sequential, slice-by-slice basis if a highly non-isotropic volume is used (e.g., thick-slice scan). However, for the case of thin-slice scan or a reconstructed isotropic volume, the detection function can be in 3D mode, where thresholding and convolution operations are conducted by using the entire volume.

For each image, the lung regions segmented from step 0110 are used and are subjected to the following process (0700). The first step is an enhance filtering for matching of the nodule's intensity profile (step 0710). The next step is multiple gray-level thresholding (step 0715) to determine the initial nodule locations (step 0720) and to extract the initial features (step 0725) The gray-level thresholding steps may be performed in a manner similar to previously discussed steps of gray-level thresholding.

Once the initial features are obtained for each candidate, by analyzing the relationships between features arising at different threshold levels with respect to their shape, size and location, each feature is assigned a likelihood of being either a nodule or a vessel (step 0730). Features in adjacent slices are compared to resolve ambiguous features. The locations of detected nodule candidates, preferably in three dimensions within the lung, are then output (step 0735) and displayed (step 0740) for a radiologist's further judgment.

For the case in which two scans are used (i.e., the right-hand side of FIG. 1), object analysis (step 0120) is followed by doubling time measurement (step 0127). Doubling time, the time required for a nodule to double in size, can be mathematically calculated using known methods based on two time-differenced scans. Hence, step 0127 receives two inputs from step 0120 before it is carried out.

Returning to FIG. 1, the particular output of the process will depend upon the processes actually applied. Blocks 01351–01355 represent the output processes corresponding to the various processing steps.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method of detecting and analyzing suspected abnormalities in thoracic computer tomography (CT) images, comprising the steps of:

receiving at least first and second CT images and performing volume reformatting on the second CT image using information about the first CT image;

performing object processing to segment different anatomical structures in the CT images in at least one of two-dimensional CT slices and three-dimensional CT scans, resulting in at least one segmented image;

processing said at least one segmented image, said processing including at least one of image enhancement, object analysis, object detection, and image matching; and outputting at least one result of said processing step.

2. The method according to claim 1, wherein the step of performing volume reformatting comprises at least one of volume subsampling and interpolation.

3. The method according to claim 1, wherein the step of performing object processing comprises the steps of:

performing image thresholding on at least one of said CT images;

extracting at least one lung image from the at least one of said CT images based on the results of the image thresholding; and extracting at least one lung contour from said at least one lung image.

4. The method according to claim 3, wherein the step of image thresholding comprises the steps of:

constructing a gray-level histogram based on the output of the step of performing object processing;

performing least squares fitting of a Gaussian curve to a low-intensity range of said histogram and selecting a background threshold based thereon;

using the background threshold to eliminate low-intensity background noise from the output of the step of performing object processing;

performing voxel threshold determination, comprising the steps of:

generating a plurality of thresholded images using a plurality of possible thresholds; and performing a statistical correlation between each of the plurality of thresholded images and at least one original image to thereby determine a voxel threshold; and generating a voxel thresholded image by applying thresholding using the voxel threshold, thereby generating a binary image.

5. The method according to claim 3, wherein the step of extracting at least one lung image comprises the step of:

performing connected component labeling on an output of said step of image thresholding.

6. A method of detecting and analyzing suspected abnormalities in thoracic computer tomography (CT) images, comprising the steps of:

performing object processing to segment different anatomical structures in the CT images in at least one of two-dimensional CT slices and three-dimensional CT scans, resulting in at least one segmented image, said object processing including:

performing image thresholding on at least one of said CT images;

performing top- and bottom-most slices padding on the output of said step of image thresholding;

extracting at least one lung image from the at least one of said CT images based on the results of the image thresholding; and extracting at least one lung contour from said at least one lung image;

processing said at least one segmented image, said processing including at least one of image enhancement, object analysis, object detection, and image matching; and outputting at least one result of said processing step.

7. A method of detecting and analyzing suspected abnormalities in thoracic computer tomography (CT) images, comprising the steps of:

performing object processing to segment different anatomical structures in the CT images in at least one of two-dimensional CT slices and three-dimensional CT scans, resulting in at least one segmented image, said object processing including:

performing image thresholding on at least one of said CT images;

removing small objects from the at least one lung image, prior to the step of extracting at least one lung contour, wherein the step of removing small objects comprises performing reversed connected component labeling;

extracting at least one lung image from the at least one of said CT images based on the results of the image thresholding; and extracting at least one lung contour from said at least one lung image;

processing said at least one segmented image, said processing including at least one of image enhancement, object analysis, object detection, and image matching; and outputting at least one result of said processing step.

8. A method of detecting and analyzing suspected abnormalities in thoracic computer tomography (CT) images, comprising the steps of:

performing object processing to segment different anatomical structures in the CT images in at least one of two-dimensional CT slices and three-dimensional CT scans, resulting in at least one segmented image, said object processing including:

performing image thresholding on at least one of said CT images;

extracting at least one lung image from the at least one of said CT images based on the results of the image thresholding; and extracting at least one lung contour from said at least one lung image;

smoothing the at least one lung contour using an active contour smoothing algorithm;

processing said at least one segmented image, said processing including at least one of image enhancement, object analysis, object detection, and image matching; and outputting at least one result of said processing step.

9. The method according to claim 8, wherein the active contour smoothing algorithm is a snake algorithm.

10. A method of detecting and analyzing suspected abnormalities in thoracic computer tomography (CD images, comprising the steps of:

performing object processing to segment different anatomical structures in the CT images in at least one of two-dimensional CT slices and three-dimensional CT scans, resulting in at least one segmented image;

processing said at least one segmented image, said processing including image enhancement, including at least one step of histogram window leveling performed on the at least one segmented image; and outputting at least one result of said processing step, wherein the at least one result include an enhanced image.

11. The method according to claim 10, wherein said at least one step of histogram window leveling comprises the steps of:

lung area histogram window leveling; and mediastinum area histogram window leveling;

and wherein the results of the steps of lung area histogram window leveling and mediastinum area window leveling are combined to produce an output image.

12. The method according to claim 13, wherein the step of object analysis includes analysis of at least one of sphericity, size, HU value, and a vessel/nodule tree in the at least one segmented image.

13. A method of detecting and analyzing suspected abnormalities in thoracic computer tomography (CT) images, comprising the steps of:

performing object processing to segment different anatomical structures in the CT images in at least one of two-dimensional CT slices and three-dimensional CT scans, resulting in at least one segmented image;

processing said at least one segmented image, said processing including object analysis, said object analysis comprising:

computing a seed position for a consecutive measurement process;

performing gray-level thresholding on the at least one segmented image;

performing morphological shape processing on the output of said gray-level thresholding;

performing connected component labeling on the output of said morphological shape processing;

adjusting contours obtained in said connected component labeling;

reconstructing at least one three-dimensional object based on the adjusted contours; and performing measurements on the at least one three-dimensional object; and outputting at least one result of said processing step, the at least one result comprising at least one of an image, a feature, or a measurement.

14. The method according to claim 13, wherein the step of computing a seed position comprises the step of:

determining a center of gravity from a predefined local image window.

15. The method according to claim 13, wherein the step of adjusting contours comprises the step of:

performing neighbor profile tracing.

16. The method according to claim 1, wherein the step of processing comprises a step of object detection, and wherein the at least one result output in the outputting step comprises at least one of an image, a feature, and a measurement.

17. The method according to claim 16, wherein the step of object detection includes at least one of image enhancement, initial selection, three-dimensional object grouping, feature extraction, and classification.

18. The method according to claim 16, wherein the step of object detection comprises the steps of:

filtering an input image;

performing gray-level thresholding on the filtered input image;

making an initial nodule selection based on the output of the gray-level thresholding;

extracting features based on the output of the initial nodule selection; and classifying objects determined in the step of initial nodule selection using the features extracted in the step of extracting features.

19. The method according to claim 18, wherein the step of filtering comprises the step of:

performing enhancement filtering for matching a nodule's intensity profile.

20. The method according to claim 18, wherein the step of classifying objects comprises the step of:

analyzing relationships between features arising at different threshold levels with respect to at least one of size, shape, and location.

21. A method of detecting and analyzing suspected abnormalities in thoracic computer tomography (CT) images, comprising the steps of:

performing object processing to segment different anatomical structures in the CT images in at least one of two-dimensional CT slices and three-dimensional CT scans, resulting in at least one segmented image;

processing said at least one segmented image, said processing including:
object analysis performed on the output of said object processing; and
measuring doubling time based on results of said object analysis; and outputting at least one result of said processing step, wherein the at least one result comprises a measurement of doubling time.

22. The method according to claim 21, wherein the step of measuring doubling time comprises the step of:

calculating doubling time based on at least two time-differenced CT scans.

23. The method according to claim 1, wherein the step of processing comprises a step of image matching based on the output of said object processing, and wherein the at least one result output in the outputting step comprises at least one of an image and a measurement.

24. A method of detecting and analyzing suspected abnormalities in thoracic computer tomography (CT) images, comprising the steps of:

performing object processing to segment different anatomical structures in the CT images in at least one of two-dimensional CT slices and three-dimensional CT scans, resulting in at least one segmented image;

processing said at least one segmented image, said processing including image matching based on an output of said object processing, wherein said image matching includes at least one of slice matching, volume matching, or slice warping, and wherein said image matching involves results obtained from at least two CT images; and outputting at least one result of said processing step, said at least one result comprising at least one of an image or a measurement.

25. The method according to claim 24, wherein the step of processing comprises a step of slice matching, and wherein the step of slice matching comprises the steps of:

generating a curve from two-dimensional features in each CT image;

computing a gradient for each curve;

correlating gradients of the curves; and determining a shift distance in one CT image with respect to the other CT image.

26. A method of detecting and analyzing suspected abnormalities in thoracic computer tomography (CT) images, comprising the steps of:

performing object processing to segment different anatomical structures in the CT images in at least one of two-dimensional CT slices and three-dimensional CT scans, resulting in at least one segmented image;

processing said at least one segmented image, said processing including image matching based on an output of said object processing, said image matching comprising:

inputting the outputs of said object processing corresponding to two CT images obtained at different times;

computing a lung area curve for each of the CT images;

fitting the two lung area curves thus computed to each other;

registering lung surface volume based on the results of the step of fitting; and warping one of the CT images to the other CT image; and outputting at least one result of said processing step, said at least one result comprising at least one of an image or a measurement.

27. The method according to claim 26, wherein the step of fitting the two lung area curves comprises the step of:

comparing the two lung area curves to minimize a sum of squared differences.

28. The method according to claim 26, wherein the step of registering lung surface volume comprises the step of:

using an iterative closest point algorithm to determine a transformation by which to transform one CT image onto the other CT image.

29. The method according to claim 28, wherein said step of warping comprises the step of:

transforming the one CT image onto the other CT image using the transformation determined using the iterative closest point algorithm.

* * * * *